Aug. 5, 1930.　　　　F. C. ZEISBERG　　　　1,772,123
PROCESS FOR THE HIGH CONCENTRATION OF NITRIC ACID
Filed Aug. 2, 1928
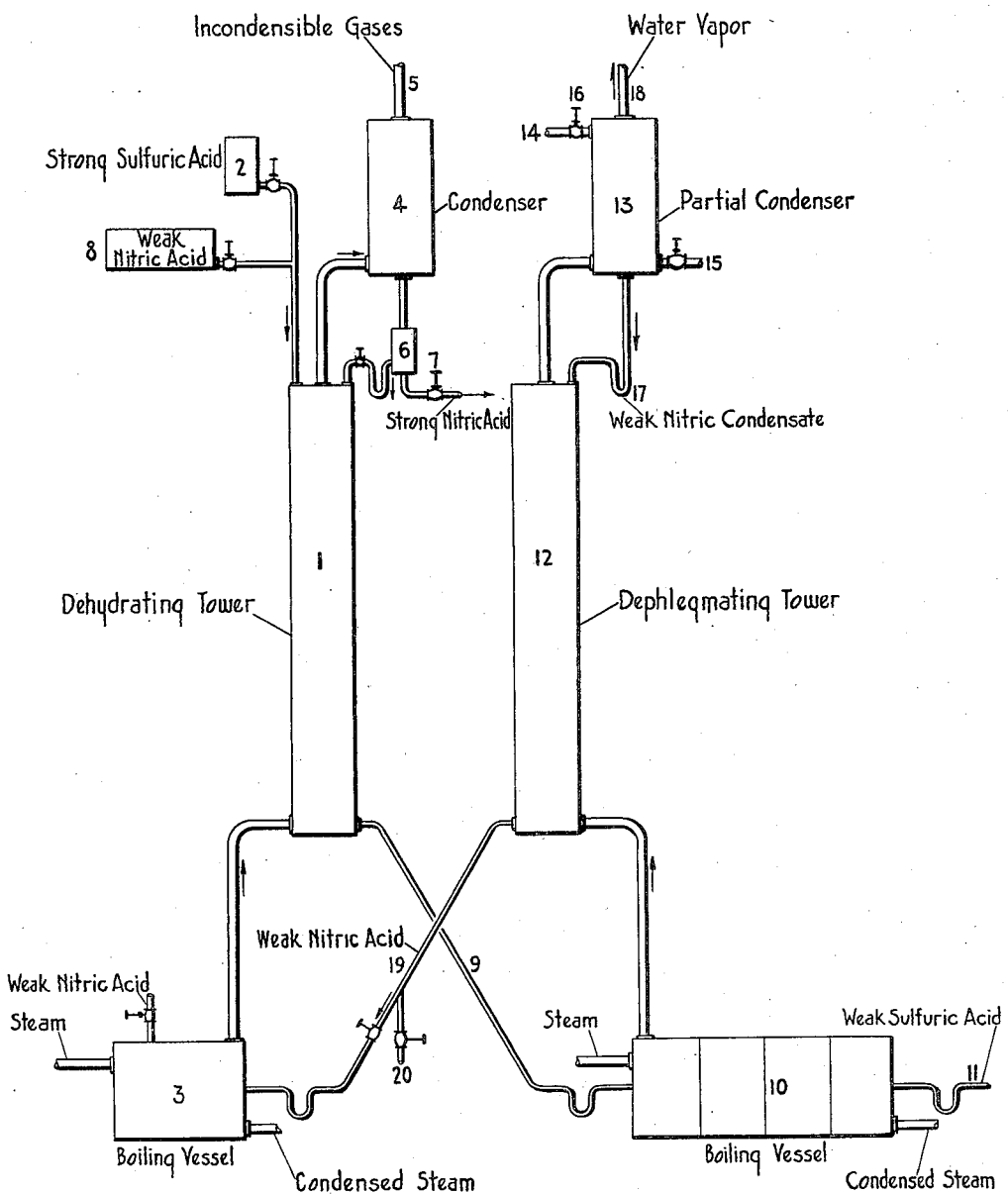
Fred C. Zeisberg Inventor
By his attorney
Albert T. St Clair Patented Aug. 5, 1930

1,772,123

UNITED STATES PATENT OFFICE

FRED C. ZEISBERG, OF WILMINGTON, DELAWARE, ASSIGNOR TO E. I. DU PONT DE NEMOURS & COMPANY, OF WILMINGTON, DELAWARE, A CORPORATION OF DELAWARE

PROCESS FOR THE HIGH CONCENTRATION OF NITRIC ACID

Application filed August 2, 1928. Serial No. 296,920.

This invention relates to the art of nitric acid manufacture, and more particularly to an improved process for the high concentration of nitric acid.

In my co-pending application, Serial No. 201,609, filed June 27, 1927, of which this application is in part a continuation, I have disclosed an improved continuous process for concentrating nitric acid, having for its object a reduction in the sulfuric ratio (i. e. the number of pounds of 100% sulfuric acid used for every pound of 100% nitric acid turned out by the process), and in the amount of sulfuric acid concentration required to bring the spent sulfuric acid discharged from the process back to a concentration suitable for re-use in the process or for sale.

It is an object of the present invention to effect a further decrease in the sulfuric ratio.

It is another object of the present invention to effect a further decrease in the required sulfric acid concentration to restore it to suitable condition for re-use.

With the above and other objects in view, which will be apparent as the description proceeds, I have set forth my invention in the following specification, taken in connection with the accompanying drawing, which shows a diagrammatic side elevation of one assembly of apparatus suitable for carrying out my new process.

In the accompanying drawing, 1 is a packed, acid resistant dehydrating tower supplied at the top with a regulated amount of strong dehydrating agent, preferably sulfuric acid, from a container 2, and at the bottom with aqueous nitric acid vapor from a boiling pot 3. The latter is constructed of nitric acid resistant material, such as chrome iron, and is supplied continuously with a stream of dilute acid to be concentrated, and with any regulable heating means, such as steam. Vapors of strong nitric acid distil from the top of the tower into a condenser 4, which condenses all the nitric acid and the little accompanying water, allowing incondensible gases to pass off through pipe 5 to the absorption system, and the strong nitric acid condensate to drop into an overflow box 6, and to be drawn off to storage through a regulating valve 7.

As pointed out in my co-pending application referred to above, I have found it highly advantageous to abstract heat from the sulfuric acid as this allows it to be used more fully as a dehydrating agent, and therefore reduces the amount used. This may be done by refluxing a portion of the concentrated nitric acid from the condenser 4, as shown herein and as set forth and claimed in my co-pending application, or by means of a cooling coil (not shown). However, I prefer to do this by mixing weak nitric acid, supplied from any convenient container 8, with the strong sulfuric acid supplied at the top of the dehydrating tower. The nitric acid thus supplied to the dehydrating tower is revaporized therein, causing the removal of heat therefrom.

There emerges from the bottom of column 1, through a trapped line 9, boiling, incompletely denitrated sulfuric acid carrying practically all of the water content of the dilute nitric acid, and this is conducted to a boiling vessel 10. The latter is constructed of acid proof material and can be heated in any convenient regulable manner, as by steam. As shown, it is a single vessel with partitions preventing the mixing of the incoming acid and its vapors with the outgoing acid and its vapors, but any other apparatus, such as a series of separate vessels, which would effect the discharge of the nitric acid free sulfuric acid through a trapped line 11, could be used. The discharged acid preferably has a strength of about 73% $H_2SO_4$.

The vapors evolved in vessel 10, consisting of a mixture of water and nitric acid, with water in excess, are passed into a dephlegmating tower 12 of any well known type, constructed of acid-proof material and packed with suitable filling material.

The vapors from the top of this tower go to a partial condenser 13, which is supplied with a regulable supply of cooling water that enters at 14 and leaves at 15. By means of a valve 16 the cooling is regulated so that practically all the nitric acid vapors are condensed in condenser 13 and returned to the dephlegmating tower 12 through a trapped line 17 as a very weakly acid condensate. The water vapor entering condenser 13 is only partially condensed, the uncondensed portion escaping to the atmosphere through a pipe 18. The weakly acid condensate returned to the dephlegmating tower 12 absorbs part of the nitric acid vapors rising through this tower, and passes out at the bottom through a trapped line 19 as weak nitric acid. It may be removed through a pipe 20 when desired, but is preferably returned to the boiling vessel 3.

All the nitric acid of the liquid aqueous nitric acid entering the dehydrating tower 1 therefore eventually finds its way out of the process through valve 7 as strong nitric acid. All of the water in this aqueous nitric acid also finds its way out of the process, most of it through pipe 11 accompanied by all the sulfuric acid introduced from container 2, a little through valve 7 with the strong nitric acid, and a larger and variable amount as water vapor through pipe 18. This separation is accomplished by applying heat in regulated amount to boiling vessels 3 and 10 and abstracting heat in regulated amount by condensers 4 and 13, while flowing through the system strong sulfuric acid from which heat is abstracted by the revaporization of nitric acid mixed therewith.

Three illustrative examples, which should not be construed as limitations with regard to concentrations and quantities, are given below to show the advantages of the new process.

*Example 1.*—The vapors of 60% nitric acid are passed up the dehydrating tower 1 against a counter-current formed by mixing 60% nitric acid with 109% sulfuric acid (fuming) until the resulting mixture contains approximately 57.5% of $H_2SO_4$ and 28.3% of $HNO_3$. The vapors of nitric acid, containing about 95% $HNO_3$, by weight, issue from the top of the dehydrating tower 1 and a boiling mixture, containing about 65% $H_2SO_4$ and about 4% $HNO_3$, issues from the bottom. This mixture contains about 8% of the $HNO_3$ originally in the 60% nitric acid supplied to the dehydrating tower as mixed acid and vapor and, when boiled in the vessel 10 until free of nitric acid, will contain about 73% $H_2SO_4$. The vapors entering column 12 will hence contain about 35% $HNO_3$ whence by proper dephlegmation, they can be returned through pipe 19 as a liquid containing about 58% $HNO_3$. Operating in this manner the sulfuric ratio will be about 1.25 and the sulfuric acid turned out by the process will have to be concentrated from 73% $H_2SO_4$ to whatever may be a commercially salable strength, e. g. 92%, while all the $HNO_3$ will be recovered highly concentrated, for example as 95% $HNO_3$.

*Example 2.*—If a 92% sulfuric acid is used, i. e., an acid of a strength which can be obtained by concentration of the dilute sulfuric acid discharged by this process, then a higher sulfuric ratio will be necessary, viz, about 1.85, the starting mixture in this case containing about 62.0% $H_2SO_4$ and 19.5% $HNO_3$. The remainder of the process corresponds to Example 1.

*Example 3.*—If refluxing is resorted to, using 92% sulfuric acid and 60% nitric acid and producing a 95% distillate, the dehydrating tower 1 is so operated that about 2.5 lbs. $HNO_3$ are returned to the top of the tower as reflux for every 1 lb. $HNO_3$ drawn off as concentrated nitric acid. Under these operating conditions there runs off from the foot of the dehydrating tower a boiling mixture containing about 65% $H_2SO_4$ and about 4% $HNO_3$ as in Example 1, and this is treated in the same manner. The sulfuric ratio will be about 2.5.

If the process of my co-pending application were used it would be impossible, with the same sulfuric ratio and with the acids at the same initial strength, to recover all of the $HNO_3$ as strong acid, but the portion of the $HNO_3$ originally used, which comes out of the dehydrating tower mixed with sulfuric acid, would have to be driven off in the denitrating tower with an excess of steam, thus unduly weakening the sulfuric acid, and the nitric acid vapors would have to be separately condensed to an acid of 30% strength or lower.

It will thus be seen that my new process has the advantage that it turns out the whole of the nitric acid as strong nitric acid, that no extraneous water is introduced into the acid system, that less sulfuric acid is required per pound of nitric acid concentrated, and that it requires concentration of sulfuric acid through a narrower range, thus in turn permitting a decrease in the amount of sulfuric acid concentrating equipment necessary.

It will be apparent that the apparatus disclosed herein as the preferred embodiment of my invention may be varied in many ways, for example, by combining the partial condenser 13 with the dephlegmating tower 12, in which case the latter would be made taller and a regulated amount of cold water would be introduced on top of the packing in tower 12.

It will also be readily understood by those skilled in the art that the amount of dilute nitric acid mixed with the concentrated sulfuric acid to form the counter-current will vary in accordance with the strength of each of these acids and of the dilute nitric acid being concentrated, as will also the quantity of concentrated nitric acid refluxed when the reflux method of abstracting heat is utilized. Likewise, the percentage of sulfuric acid run off from the foot of the dehydrating tower and that withdrawn from boiling vessel 10 will depend on the amount of dehydration which has been effected, but in general I prefer to adjust the proportions of nitric and sulfuric acids used in the counter-current to accomplish the maximum dehydration for the quantity of sulphuric acid used, without weakening the sulfuric acid to the point at which denitration is difficult, hence these proportions are usually so chosen as to produce a concentration of approximately 65% $H_2SO_4$ in the boiling mixture removed from the foot of the dehydrating tower, and a concentration of about 73% $H_2SO_4$ for removal from boiling vessel 10.

As many apparently widely different embodiments of this invention may be made without departing from the spirit thereof, it is to be understood that I do not limit myself to the foregoing examples or description, except as indicated in the following patent claims.

I claim:

1. A continuous process of producing highly concentrated nitric acid which comprises introducing into one end of an unheated counter current system vapors of dilute nitric acid, without other heating medium, introducing into the extreme opposite end of said system an unheated mixture of liquid dehydrating agent and dilute nitric acid, withdrawing from said opposite end of the system vapors of highly concentrated nitric acid, and withdrawing from the other end dilute nitric acid-containing liquid dehydrating agent.

2. The process of claim 1 wherein the dehydrating agent is sulfuric acid.

3. The process of claim 1 wherein the dehydrating agent is fuming sulfuric acid.

4. A process of producing highly concentrated nitric acid by introducing into one end of an unheated counter current system vapors of dilute nitric acid, without other heating medium, introducing into the extreme opposite end of said system a mixture formed by mixing fuming sulfuric acid with dilute nitric acid to produce a resulting concentration of substantially 57.5% sulfuric acid in the counter-current.

5. The process of claim 1 wherein the withdrawing dehydrating agent is boiled by indirect heating to separate weak nitric acid vapor and water vapor therefrom, and condensing the weak nitric acid vapor.

6. The process of claim 1 wherein the escaping counter-current is boiled by indirect heating to separate weak nitric acid vapor and water vapor therefrom, condensing the weak nitric acid vapor, and revaporizing the condensed weak nitric acid thus produced with other portions of dilute nitric acid to subject it to the action of a further supply of counter-current.

7. A process of producing highly concentrated nitric acid by continuously introducing, in a suitable tower, vapors of aqueous nitric acid against a counter-current comprising a mixture of concentrated sulfuric acid and dilute nitric acid, removing the concentrated nitric acid from the system, separating the nitric acid as a vapor from the escaping counter-current, subjecting this vapor to dephlegmation, and returning all the condensed weak nitric acid to the source of the aqueous nitric acid for revaporization.

8. The process of claim 7 wherein the concentration of the sulfuric acid in the counter current mixture is substantially 57.5%.

9. A process of producing highly concentrated nitric acid by introducing at one end of a suitable tower, vapors of aqueous nitric acid, introducing at the opposite end a counter-current comprising a mixture of concentrated sulfuric acid and dilute nitric acid, removing the concentrated nitric acid from the system, indirectly heating the escaping mixture of hot sulfuric acid, nitric acid and water to separate nitric acid and water vapors from the sulfuric acid, removing the latter, and condensing the weak nitric acid vapor.

10. The process of claim 9 wherein the counter-current also contains weak nitric acid, and the concentration of the sulfuric acid in the resulting mixture is substantially 57.5%.

11. A process of producing highly concentrated nitric acid by introducing, in a suitable tower, vapors of about 60% nitric acid against a counter-current composed of weak nitric acid and fuming sulfuric acid having a resulting concentration of about 57.5% sulfuric acid, removing the concentrated nitric acid from the system, boiling the escaping mixture of hot sulfuric acid, nitric acid and water by indirect heating to separate nitric acid and water vapors from the sulfuric acid, removing the latter, condensing the weak nitric acid vapor, and returning the latter to the source of the 60% nitric acid for revaporization.

12. A process of continuously treating weak nitric acid to give a substantially 100% yield of concentrated nitric acid, which consists in conducting vapors of the weak nitric acid, without other heating medium, against an unheated counter-current of liquid dehydrating agent mixed with dilute nitric acid, removing the concentrated nitric acid from the system, boiling the escaping mixture of the counter-current by indirect heating to vaporize its nitric acid content, condensing the nitric acid in the resulting vapors, and returning said condensate to an unconcentrated portion of weak nitric acid.

In testimony whereof, I affix my signature.

FRED C. ZEISBERG.